US011251958B2

(12) United States Patent
Widmann et al.

(10) Patent No.: US 11,251,958 B2
(45) Date of Patent: Feb. 15, 2022

(54) SECURITY SYSTEM WITH ADAPTIVE AUTHENTICATION BASED ON TOKENIZATION CHAINING

(71) Applicant: BANK OF AMERICA CORPORATION, Charlotte, NC (US)

(72) Inventors: Craig D. Widmann, Chandler, AZ (US); Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 381 days.

(21) Appl. No.: 16/537,888

(22) Filed: Aug. 12, 2019

(65) Prior Publication Data

US 2021/0051015 A1 Feb. 18, 2021

(51) Int. Cl.
*H04L 9/32* (2006.01)
*H04L 9/08* (2006.01)
*G06N 20/00* (2019.01)
*G06K 9/62* (2022.01)

(52) U.S. Cl.
CPC .......... *H04L 9/3213* (2013.01); *G06K 9/6264* (2013.01); *G06N 20/00* (2019.01); *H04L 9/0863* (2013.01); *H04L 9/0866* (2013.01); *H04L 9/3265* (2013.01)

(58) Field of Classification Search
CPC ... H04L 9/3213; H04L 9/0863; H04L 9/0866; H04L 9/3265; G06N 20/00; G06K 9/6264
See application file for complete search history.

(56) References Cited

U.S. PATENT DOCUMENTS

| 7,975,139 | B2 | 7/2011 | Coulier |
| 9,426,139 | B1* | 8/2016 | McClintock ............ H04L 63/08 |
| 9,589,127 | B2 | 3/2017 | Copsey |
| 9,646,150 | B2* | 5/2017 | Toth ...................... H04L 9/3231 |
| 9,722,989 | B2 | 8/2017 | Copsey |
| 9,736,149 | B2 | 8/2017 | Bettenburg et al. |
| 9,992,022 | B1 | 6/2018 | Chapman et al. |
| 10,091,199 | B2 | 10/2018 | Copsey |
| 10,158,480 | B1 | 12/2018 | Winklevoss et al. |
| 10,158,611 | B2 | 12/2018 | Castagna |

(Continued)

*Primary Examiner* — Hee K Song
(74) *Attorney, Agent, or Firm* — Moore & Van Allen PLLC; R. W. McCord Rayburn

(57) ABSTRACT

A system for generating a hybrid token architecture for chaining authenticated interactions is provided. The system includes a memory device for storing computer-readable program; a communication device connected to a network; and a processing device, wherein the processing device is configured to: initiate an authentication session of a user associated with a user interaction; determine an authentication identifier based on at least one of the authentication session and the user interaction, the authentication identifier comprising at least one of a device portion, a user portion, and an authentication record portion; generate a unique token based on the authentication identifier, wherein the unique token is required for a subsequent authentication session, and wherein the unique token links the authentication session with the subsequent authentication session, the authentication session and the subsequent authentication session forming a chain of successive authentication sessions; and store the unique token for the subsequent authentication session.

20 Claims, 9 Drawing Sheets

(56) References Cited

U.S. PATENT DOCUMENTS

| | | |
|---|---|---|
| 10,164,779 B2 | 12/2018 | Uhr et al. |
| 10,270,599 B2 | 4/2019 | Nadeau et al. |
| 2017/0366348 A1 | 12/2017 | Weimer et al. |
| 2018/0139606 A1* | 5/2018 | Green .................... H04L 63/107 |
| 2019/0013933 A1 | 1/2019 | Mercuri et al. |
| 2019/0246274 A1* | 8/2019 | Green ..................... H04L 63/08 |
| 2019/0306248 A1* | 10/2019 | Swarangi .............. H04L 9/0861 |

* cited by examiner

SECURITY SYSTEM WITH ADAPTIVE AUTHENTICATION BASED ON TOKENIZATION CHAINING

BACKGROUND

Device and user identity impersonation are common methods of unauthorized access used for attempted misappropriation of user resources. While current systems and devices employ authentication checks to discourage unauthorized access, the prevalence of compromised data can render traditional authentication methods susceptible to unwanted intrusion by an unauthorized user. Therefore, there exists a need for an improved system for generating unique and reliable authentication tokens for authorized device and user identification during an interaction.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for generating a hybrid token architecture for chaining authenticated interactions is provided. The system comprises: a memory device with computer-readable program code stored thereon; a communication device connected to a network; and a processing device, wherein the processing device is configured to execute the computer-readable program code to: initiate an authentication session of a user associated with a user interaction; determine an authentication identifier based on at least one of the authentication session and the user interaction, the authentication identifier comprising at least one of a device portion, a user portion, and an authentication record portion; generate a unique token based on the authentication identifier, wherein the unique token is required for a subsequent authentication session, and wherein the unique token links the authentication session with the subsequent authentication session, the authentication session and the subsequent authentication session forming a chain of successive authentication sessions; and store the unique token for the subsequent authentication session.

In a specific embodiment, the system further comprises a transformation function configured for receiving an input of the authentication identifier and generating the unique token based on the authentication identifier, wherein the transformation function comprises a hash function.

In another embodiment, the authentication record portion of the authentication identifier comprises at least one of a time, a location, a previous token, a confidence score, and information associated with a previous authentication session. In yet another embodiment, the device portion of the authentication identifier comprises at least one of device identification information, a digital signature, and a security token of a user device associated with the user and the user interaction. In yet another embodiment, the unique token is tied to a particular mobile application or mobile device. In yet another embodiment, the user portion of the authentication identifier comprises at least one of a password, a PIN, biometric information, a captured image, and a scheduled or previously executed interaction associated with the user.

In yet another embodiment, the processing device is further configured to execute the computer-readable program code to store the unique token on a user device associated with the user, wherein the user device is configured to provide the unique token during the subsequent authentication to authenticate the user.

In yet another embodiment, the unique token is stored on a particular mobile application or mobile device.

A system for dynamically reconfiguring a chain of successive authentication sessions is also provided. The system comprises: a memory device with computer-readable program code stored thereon; a communication device connected to a network; and a processing device, wherein the processing device is configured to execute the computer-readable program code to: analyze, via a machine learning model, one or more entries on an authentication chain, the authentication chain comprising a plurality of successive authentication sessions linked by a plurality of corresponding tokens; calculate confidence scores associated with each of the one or more entries based on an output of the machine learning model; determine unauthorized access associated with an entry of the one or more entries based on a corresponding confidence score being below a predetermined threshold; and in response to determining the unauthorized access, reconfigure the authentication chain, wherein reconfiguring the authentication chain comprises modifying at least one of the plurality of successive authentication sessions and the corresponding tokens.

In a specific embodiment, reconfiguring the authentication chain further comprises removing one or more entries on the authentication chain based on the confidence scores. In another embodiment, reconfiguring the authentication chain comprises generating a new authentication chain, wherein the new authentication chain comprises a portion of the authentication chain determined to be not associated with unauthorized access.

In yet another embodiment, the corresponding tokens comprise hashed values, and wherein reconfiguring the authentication chain comprises recalculating all of the hashed values based on determining the unauthorized access.

In yet another embodiment, each of the plurality of corresponding tokens comprises a device token component, a user token component, and an authentication record token component, and wherein the processing device is further configured to execute the computer-readable program code to calculate and apply a weighting for each of the token components based on the confidence scores. In yet another embodiment, the processing device is further configured to execute the computer-readable program code to modify required authentication mechanisms associated with subsequent authentication sessions based on determining the unauthorized access, wherein modifying the required authentication mechanisms comprises adding or removing one or more authentication mechanisms required by the subsequent authentication sessions. In yet another embodiment, the one or more authentication mechanisms comprise the device token component, the user token component, and the authentication record token component.

In yet another embodiment, the machine learning model comprises at least one of a deep learning neural network and a decision tree learning model. In yet another embodiment, the machine learning model comprises at least one of a supervised learning component, an unsupervised learning component, and a semi-supervised learning component.

A computer-implemented method for authenticating a user based on a chain of successive authentication sessions is also provided. The computer-implemented method comprising the steps of: initiating an authentication session with a user device associated with a requested interaction; requesting an authentication token from the user device during the authentication session, wherein the authentication token is required for authenticating the user device in the authentication session, and wherein the authentication token is generated based on a previous authentication session or user interaction, the authentication token being configured to link the authentication session with the previous authentication session on a chain of successive authentication sessions; receiving the authentication token from the user device; determining if the authentication token is a valid authentication token; and (i) based on determining that the authentication token is the valid authentication token, authenticating the user device and the requested interaction; or (ii) based on determining that the authentication token is not the valid authentication token, deny authentication of the user device and the requested interaction.

In a specific embodiment, authenticating the user device and the requested interaction further comprises: generating a new authentication token based on at least one of the authentication session and the requested user interaction, wherein the new authentication token is required for authenticating a subsequent authentication session, and wherein the new authentication token is configured to link the subsequent authentication session to the chain of successive authentication sessions.

In another embodiment, requesting the authentication token from the user device further comprising automatically extracting the authentication token from the user device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
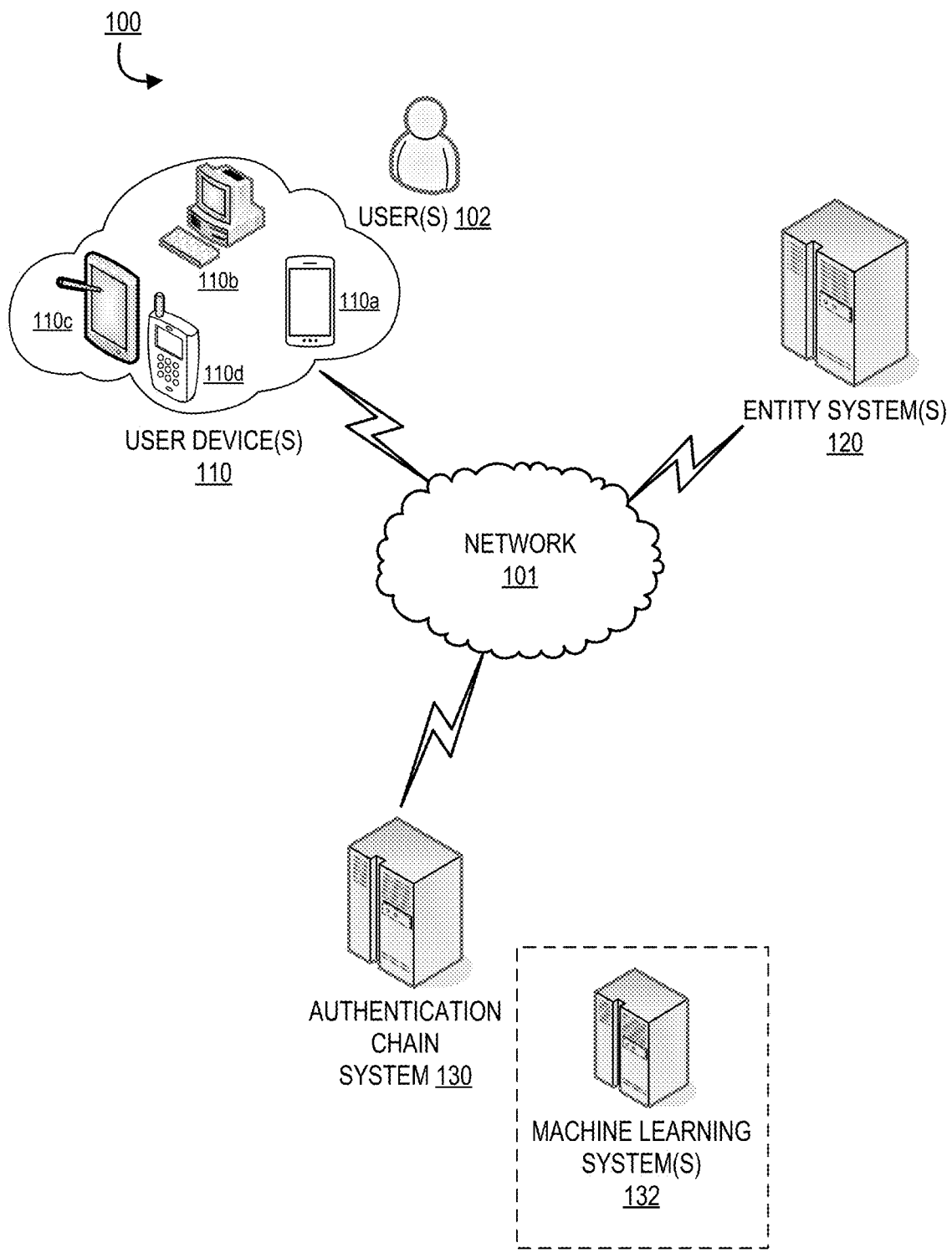
Figure 2:
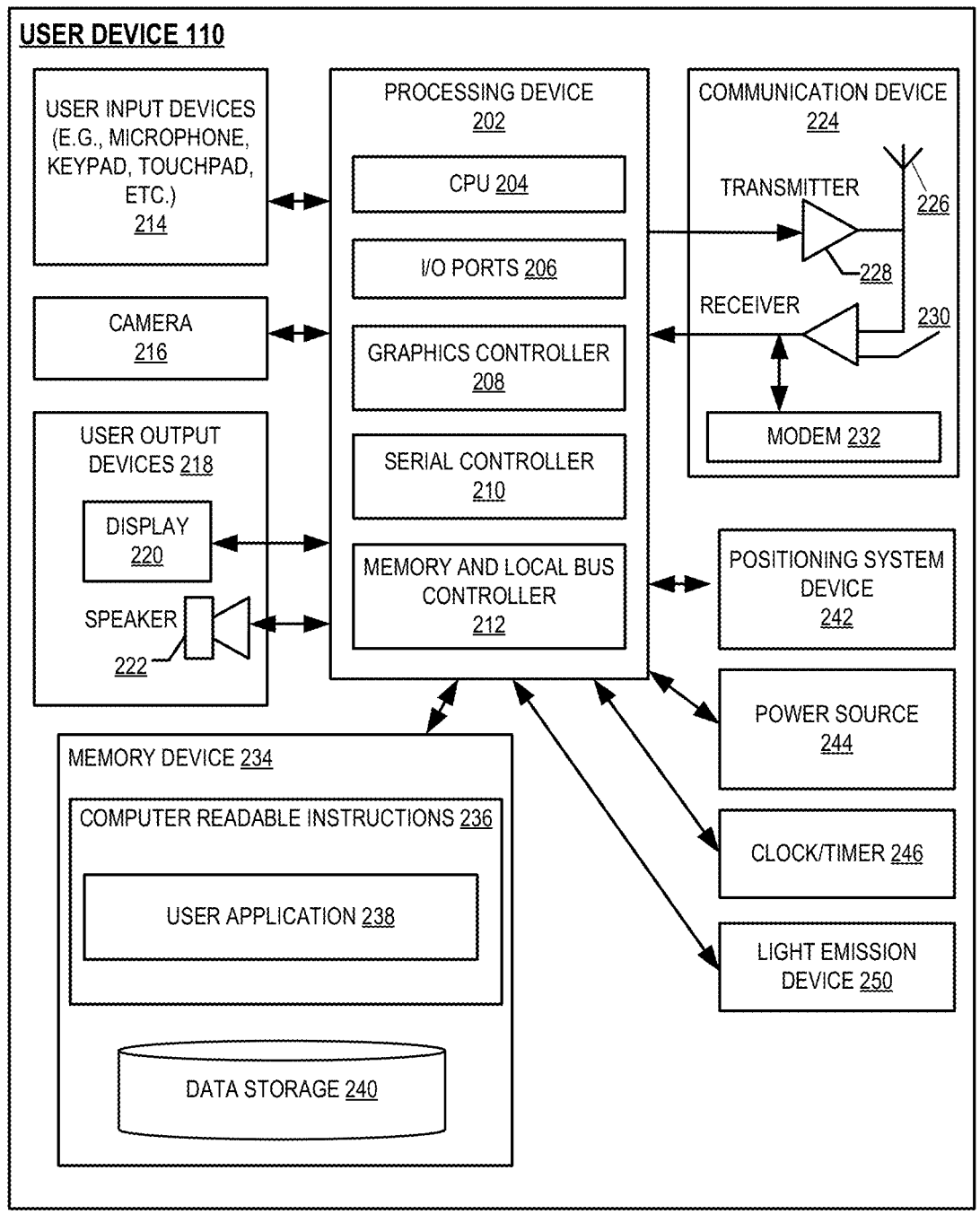
Figure 3:
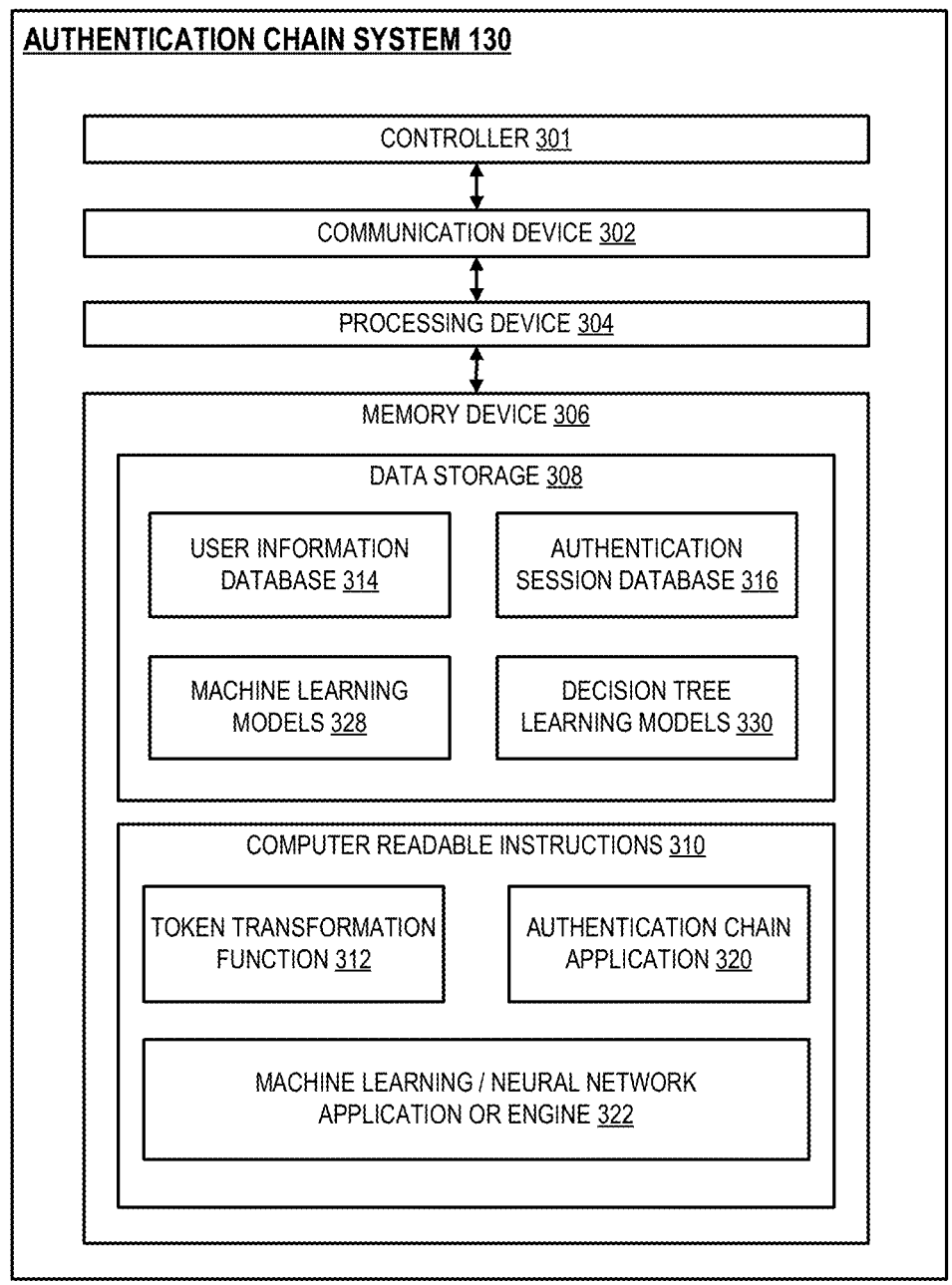
Figure 4:
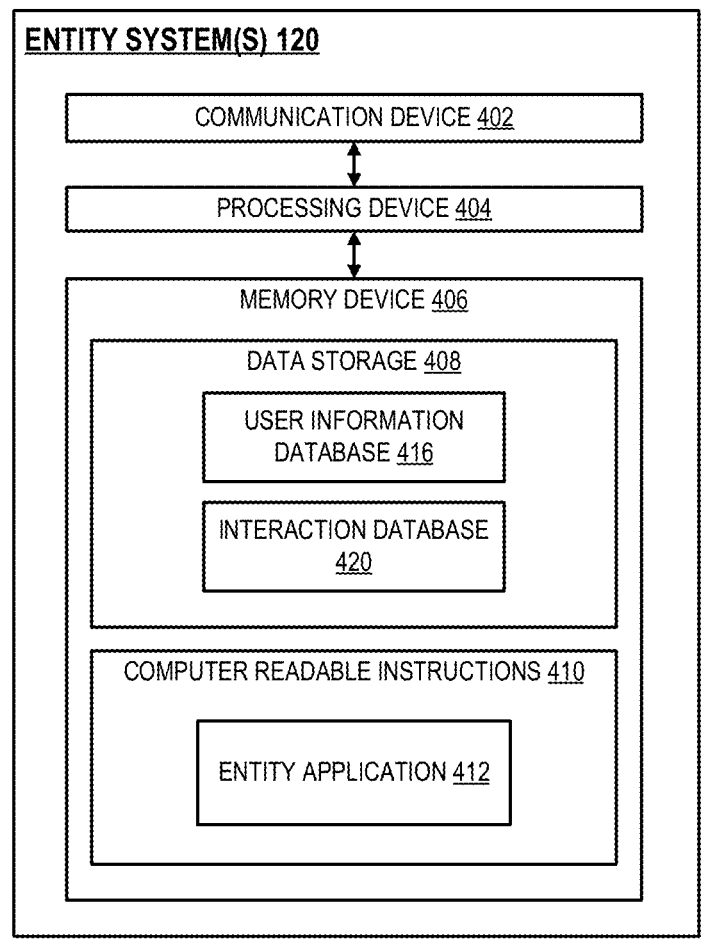
Figure 5:
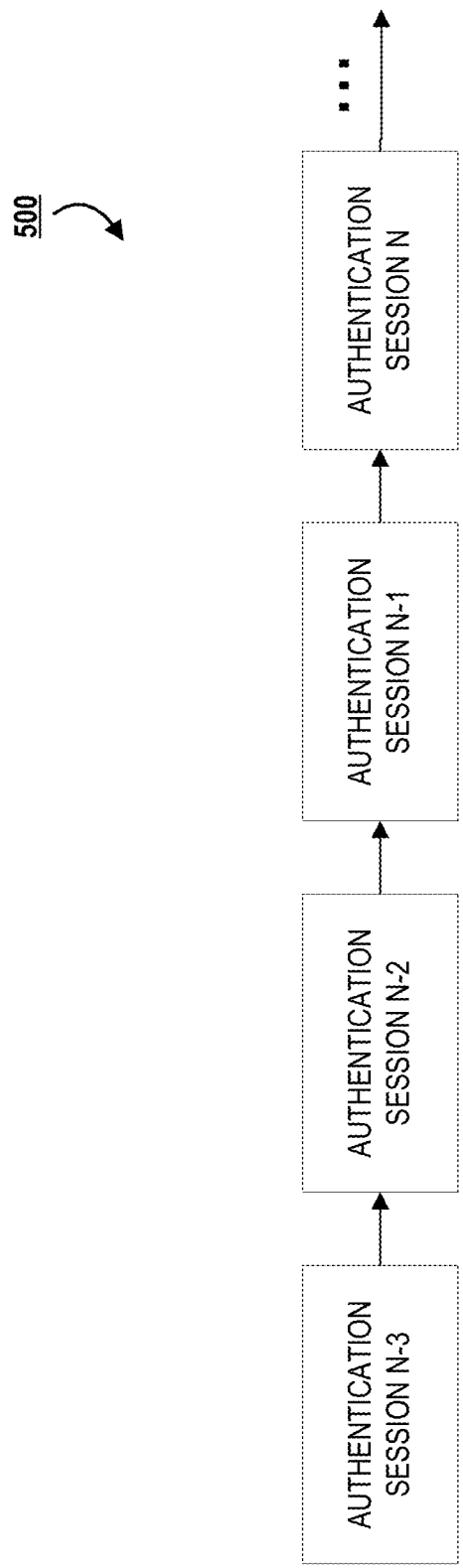
Figure 6:
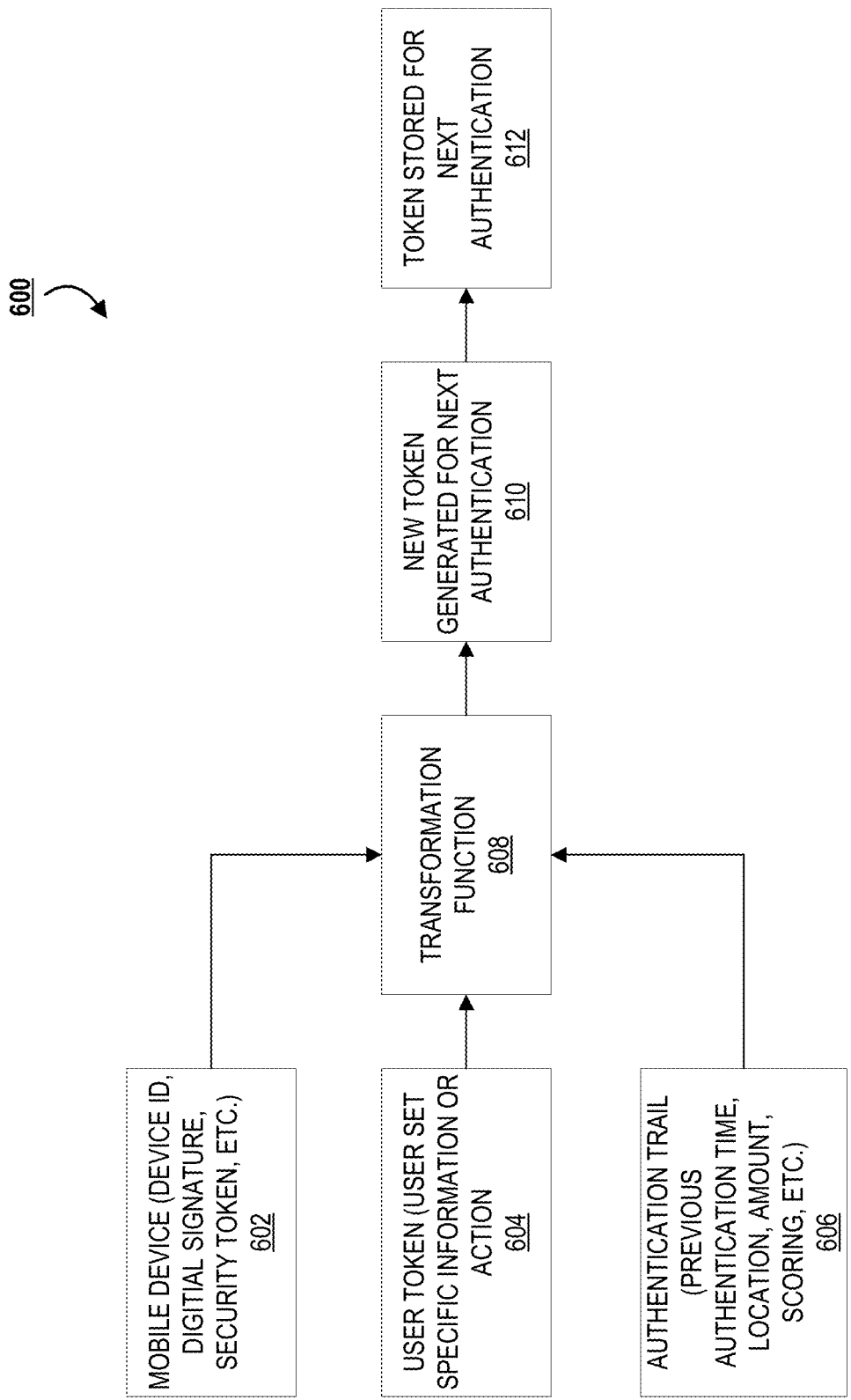
Figure 7:
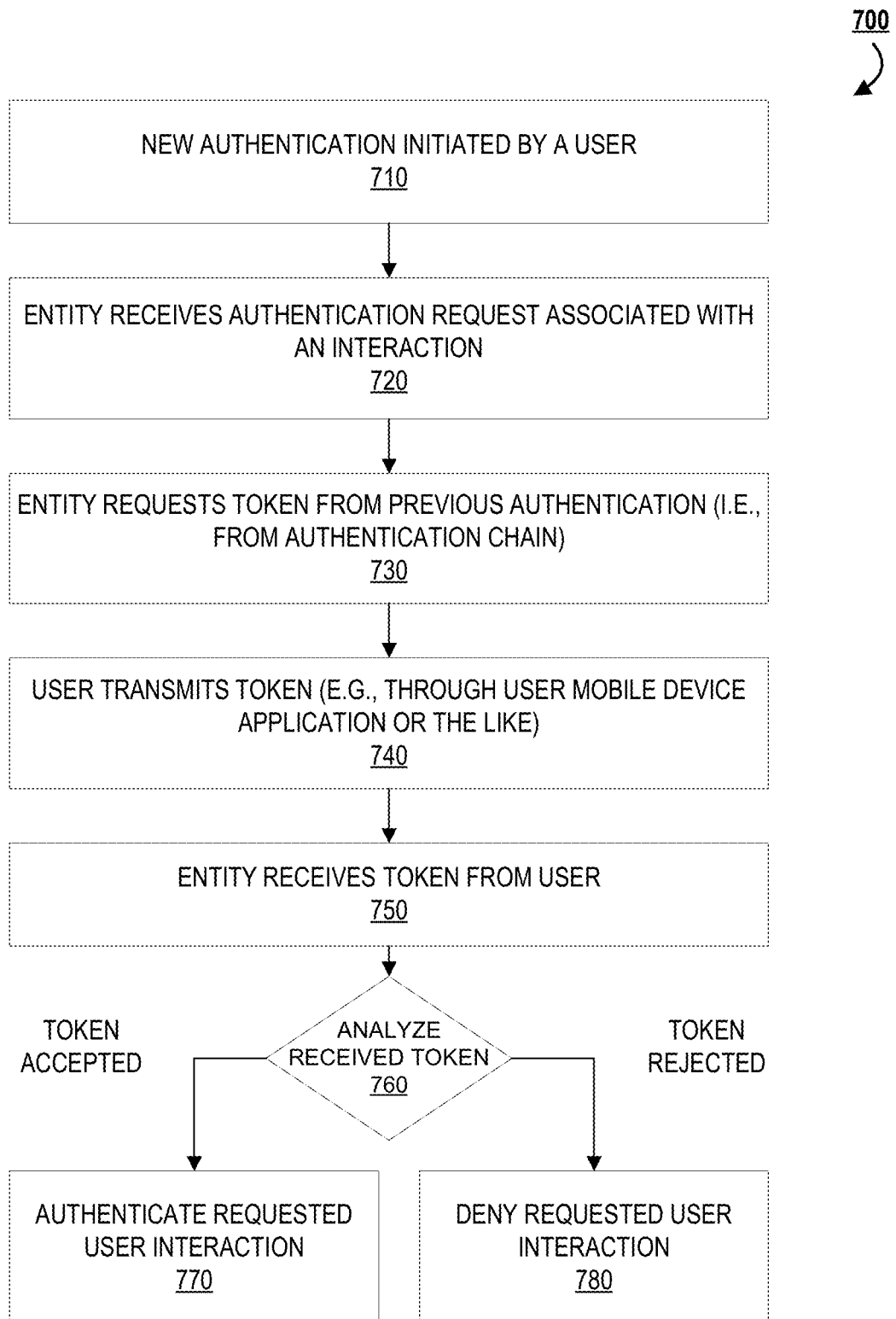
Figure 8:
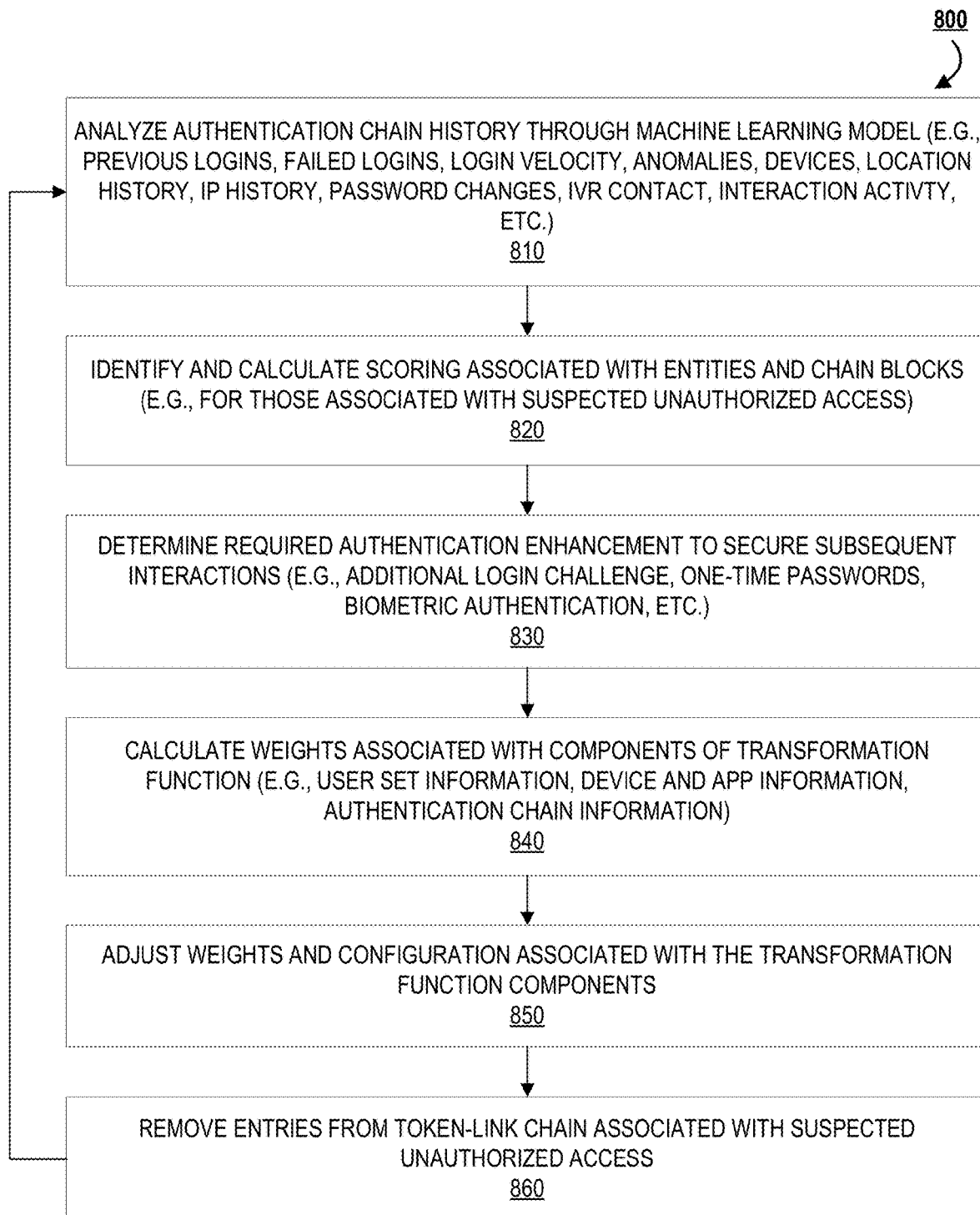
Figure 9:
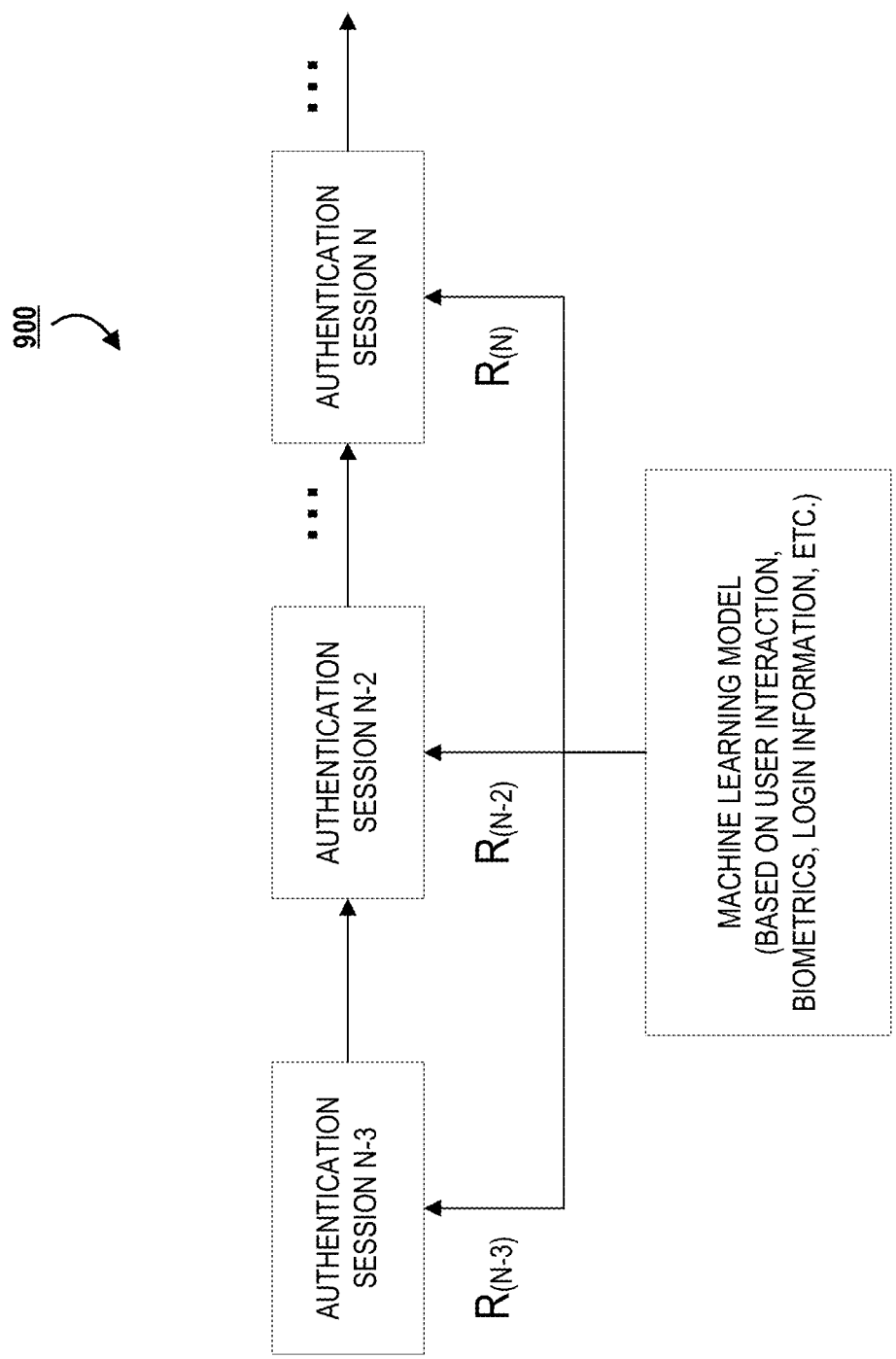

Having thus described embodiments of the invention in general terms, reference will now be made to the accompanying drawings, wherein:

FIG. 1 provides an authentication system environment, in accordance with one embodiment of the invention;

FIG. 2 provides a block diagram of a user device, in accordance with one embodiment of the invention;

FIG. 3 provides a block diagram of an authentication chain system, in accordance with one embodiment of the invention;

FIG. 4 provides a block diagram of an entity system, in accordance with one embodiment of the invention;

FIG. 5 provides an illustration of an authentication session chain, in accordance with one embodiment of the invention;

FIG. 6 provides a high level process flow for generating a hybrid authentication token, in accordance with one embodiment of the invention;

FIG. 7 provides a high level process flow for authenticating a requested interaction based on a provided authentication token;

FIG. 8 provides a high level process flow for authentication chain analysis, scoring, and reconfiguration; and FIG. 9 provides an illustration of a portion of an authentication chain, in accordance with one embodiment of the invention.

DETAILED DESCRIPTION OF EMBODIMENTS OF THE INVENTION

Embodiments of the invention, as described herein, leverage machine-learning, neural networks, and/or other complex, specific-use computer system to provide a novel approach for device and/or user identification and authentication. While being configured to prevent attempted unauthorized access in general, the authentication systems and methods described herein are further resistant to attempted unauthorized access account takeover attacks that employ compromised data or user identifying information to impersonate a user and/or user device. The system of the present invention is configured to generate a chain-like sequence of previous authentication sessions with which to validate or authorize a subsequent authentication session for a user association with a requested interaction. The system links the authentication sessions together by generating unique authentication tokens required for subsequent authentications to create a record of authentications that is difficult for unauthorized users to break or successfully insert themselves into.

The system is configured to generate an authentication token based on a combination of various components such as user-specific or user-provided data, device data, and/or data associated with a record of authentication sessions and/or interactions. The authentication chain of the present invention is configured to be flexible, meaning the system is configured to dynamically react to potential unauthorized access or other abnormalities by modifying authentication mechanisms and weighting of the token component inputs. For example, the system may modify a weighting of a user-provided password input after the system determines that the user has recently or routinely incorrectly inputs the password.

Current methods for authentication typically rely on static authentication techniques and mechanisms that do not adapt to changes in a received data stream associated with an authentication session and/or interaction. As such, the present invention addresses the vulnerability of traditional authentication methods by providing an improved, chain of successive authentication sessions linked by adaptable, unique tokens that may be used to distinguish, reliably identify, and authenticate a device and/or user. Even a simple token or hash function of only a few digits when used as described herein may prevent common unauthorized access techniques such as SIM hijacking and one-time password use by an unauthorized user.

In some embodiments, the system comprises one or more machine learning models and/or neural networks configured to monitor an authentication data stream collected during one or more authentication sessions and/or interactions so that a machine learning model and/or neural network may learn and identify patterns from monitored authentication sessions and/or interactions. The system may be configured to calculate confidence scoring for authentication sessions based on the machine learning analysis. The system may be further configured to automatically authorize or deny a requested user authentication sessions based on the analysis and confidence scoring.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "computing resource" may refer to elements of one or more computing devices, networks, or the like available to be used in the execution of tasks or processes. A computing resource may be used to refer to available processing, memory, and/or network bandwidth and/or power of an individual computing device as well a plurality of computing devices that may operate as a collective for the execution of one or more tasks (e.g., one or more computing devices operating in unison).

As used herein, the term "user" may refer to any entity or individual associated with the authentication chain system described herein. In some embodiments, a user may be a computing device user, a phone user, a mobile device application user, a customer of an entity or business, a system operator, and/or employee of an entity (e.g., a financial institution). In one embodiment, a user may be a customer accessing a user account via an associated user device, wherein data from an interaction between the user and another user and/or entity is monitored, analyzed, and/or processed by the system. In a specific embodiment, a user is a requestor of an interaction or transaction with another user or entity, wherein the user is attempting to authenticate an identity associated with the user. In another embodiment, a user may be an unauthorized user attempting to impersonate or take-over an identity associated with an authorized user. In one embodiment, a user may be an unauthorized user or group attempting to access an account without authorization (e.g., misappropriation). In some embodiments, identities of a user may include authentication information such as a static or variable key or number. In some embodiments, identities of an individual may further include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, radio, global positioning system (GPS) devices, portable digital assistants (PDAs), pagers, mobile televisions, entertainment devices, automated teller machines (ATMs), or any combination of the aforementioned. The device may be used by the user to access the system directly or through an application, online portal, internet browser, virtual private network, or other connection channel.

As used herein, the term "entity" may be used to include any organization or collection of users that may interact with the authentication chain system. An entity may refer to a business, company, or other organization that either maintains or operates the system or requests use and accesses the system. In one embodiment, the entity may be a software development entity or data management entity. In a specific embodiment, the entity may be a cybersecurity entity or misappropriation prevention entity. The terms "financial institution" and "financial entity" may be used to include any organization that processes financial transactions including, but not limited to, banks, credit unions, savings and loan associations, investment companies, stock brokerages, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution.

As used herein, "authentication information" may refer to any information that can be used to authenticate an identify a user and/or a user device. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with a device and/or account) and determine that the user has authority to access an account or system or otherwise execute an interaction. In some embodiments, the system may be owned or operated by an entity. In such embodiments, the entity may employ additional computer systems, such as authentication servers, to validate and certify resources inputted by the plurality of users within the system. In one embodiment, authentication information may be used without authorization of a user in an attempt to authenticate an unauthorized user without the authorized user knowing (e.g., unauthorized access). As used herein, "authentication information" may further refer to any information generated actively or passively by the system or a device of the system (e.g., a user device) that may be used by the system to authenticate an identity of a user and/or an associated user device. In a specific example, authentication information may include device information associated with a user device (e.g., serial number, product number, device component numbers, etc.). In another specific example, authentication information by further include data generated by and/or stored on the device or a specific data generating component of the device (e.g., a random number generator) for the purpose of accurately authenticating an identity of the device and/or an associated user.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, or data archive, wherein the system may be configured to reach out to the data source and watch, observe, or check the data source for changes, updates, variations, patterns, and the like. In other embodiments, a system may passively monitor a data source or data stream, wherein the data source or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise monitoring a data stream of encrypted authentication information during an interaction. In another specific embodiment, monitoring may comprise determining a match between incoming data patterns and known data patterns to identify unauthorized data access and/or potential misappropriation.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted from a data stream (e.g., in real-time). An interaction may include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views, etc.) and the like. In another example, an interaction may refer to a user communication via one or more channels (i.e., phone, email, text, instant messaging, brick-and-mortar interaction, and the like) with an entity and/or entity system to complete an operation or perform an action with an account associated with user and/or the entity. In a specific embodiment, an interaction may comprise a transaction or exchange of resources (e.g., funds or data (i.e., files)) between devices either directly or via an intermediate system (e.g., an entity system and/or the encrypted authentication system described below).

FIG. 1 provides an authentication system environment 100, in accordance with one embodiment of the invention. As illustrated in FIG. 1, authentication chain system 130 is operatively coupled, via a network 101, to the user device(s) 110 (e.g., a plurality of user devices 110a-110d) and the entity system(s) 120. In this way, the authentication chain system 130 can send information to and receive information from the user device 110 and the entity system 120. In the illustrated embodiment, the plurality of user devices 110a-110d provide a plurality of communication channels through which the entity system 120 and/or the authentication chain system 130 may communicate with the user 102 over the network 101.

In the illustrated embodiment, the authentication chain system 130 further comprises machine learning systems 132 which my further comprises artificial intelligence (AI) systems and/or neural network systems. These systems may be separate systems operating together with the authentication chain system 130 or integrated within the authentication chain system 130.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more entity systems 120 and/or other user devices via a user device 110 while a data stream or flow between the user device 110 and the entity system 120 and/or other user devices is intercepted and monitored by the authentication chain system 130 over the network 101. In some embodiments a user 102 is a user requesting service from the entity or interacting with an account maintained by the entity system 120. In an alternative embodiment, the user 102 is an individual interacting with the authentication chain system 130 over the network 101 and monitoring input of information from the entity systems 120 to and from the authentication chain system 130 for processing and analysis (e.g., an employee of the entity operating and/or monitoring the systems 120, 130). In another specific embodiment, the user 102 in an individual interacting with another user to complete an interaction or transaction between the two user. For example, the interaction may be executed between user devices 110 of the two users directly. In an alternative example, the interaction may be processed through another system such as entity system 120 and/or authentication chain system 130.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a light emission device 250 such as a flashlight, a visual capture device such as a camera 216, a positioning system device 242, such as a geo-positioning system device like a GPS device, an accelerometer, and the like. In one embodiment, the camera 216 may include a scanner, barcode reader, or any other image capturing device or sensor configured to capture an image. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120. In some embodiments, the user is a customer of a financial entity and the user application 238 is a resource management application providing access to a resource location maintained by the entity system 120 wherein the user may interact with a resource location via a user interface of the user application 238. In one embodiment, the user application 238 may be configured to allow a user 102 to request, initiate, and/or receive an interaction with another device or system. In some embodiments, the memory device 234 may store information or data generated by the authentication chain system 130 and/or by the processes described herein. In a specific embodiment, the memory device 234, and more specifically the data storage 240, may be configured to store an authentication token or a components of an authentication token generated by the systems and processes described herein.

The processing device 202 may be configured to use the communication device 224 to communicate with one or more other devices on a network 101 such as, but not limited to the entity system 120 and the authentication chain 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 201. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, 248, are loaded into the temporary memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

FIG. 3 provides a block diagram of an authentication chain system 130, in accordance with one embodiment of the invention. The authentication chain system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, and/or the authentication chain system 130, in order to interface, monitor, and manage data flow between systems while executing commands to control the systems. In some embodiments, the controller 301 may be integrated into or be placed in one or more of the systems described herein. In other embodiments, the controller 301 may be a separate system or device. In some embodiments, the controller 301 may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the authentication chain system 130 comprises computer-readable instructions 310 stored in the memory device 306, which in one embodiment includes the computer-readable instructions 310 of a token transformation function 312, an authentication chain application 320, and a machine learning application 314 which further comprises an artificial intelligence and/or neural network engine. As previously discussed, the token transformation function 312 may be configured to receive a data input (e.g., user, user device, and authentication or interaction stream data components) and generate a unique authentication token based on the input. In one embodiment, the token transformation function 312 comprises a hash function or the like. In another specific embodiment, the authentication chain system 130 may be configured to install or store an output of the token transformation function 312 on another device (e.g., user device 110). In some embodiments, the authentication chain application 320 may be configured to receive identification information or other data (e.g., a received token) from another device in order to authenticate the device and/or associated user based on an analysis of the token and/or one or more interaction or actions performed by the user device and/or associated user during an attempted authentication session. In another embodiment, the authentication chain application 320 may be configured to train machine learning models (e.g., machine learning models 328) and/or other devices with a data stream to identify a unique stream pattern of the data stream (e.g., a pattern of unauthorized access). In one embodiment, the machine learning application 322 may be utilized by the authentication chain application 320 and/or the token transformation function 312 to monitor and analyze an interaction or authentication session data stream to distinguish learn and/or identify unique stream patterns for device and/or associated user authentication.

In some embodiments, the memory device 306 includes data storage 308 for storing data related to the system environment, but not limited to data created and/or used by the token transformation function 312, authentication chain application 320, and the machine learning application or engine 322. Data stored in the data storage 308 may comprise a user information database 314, an authentication session database 316, and one or more machine learning models 328.

The user information database 314 is used to store information and data associated with one or more users and/or user devices as described herein. In some embodiments, the user information database 314 may include user identifying information, user account information, user interaction information (e.g., historical interactions, account actions or events, transactions, communications, inputs), user device information (e.g., device identification information, device serial numbers, digital signatures, device security tokens), and the like.

The authentication session database 316 is used to store information regarding validated authentication sessions of authorized user devices and/or associated users. For example, the authentication session database 316 may include previously validated authentication sessions and/or unique stream patterns, actions, or data associated with the authentication sessions. The authentication session database 316 may include authentication information such as one or more patterns, look-up tables, tokens, hashes, or the like for identifying a particular device and/or associated user. The system may be configured to access and update stored information and data stored in the authentication session database 316 as additional information is collected. In one embodiment, the authentication session database 316 may store and/or monitor a chain of successive authentication sessions associated with a particular user and/or user device. In one embodiment, the authentication session database 316 may store information related to invalidated or denied authentication sessions (e.g., associated users, user devices, and related information).

In one embodiment of the invention, the authentication chain system 130 may associate with applications having computer-executable program code that instruct the processing device 304 to perform certain functions described herein. In one embodiment, the computer-executable program code of an application associated with the user device 110 and/or the entity systems 120 may also instruct the processing device 304 to perform certain logic, data processing, and data storing functions of the application.

Embodiments of the authentication chain system 130 may include multiple systems, servers, computers or the like maintained by one or many entities. In some embodiments, the authentication chain system 130 may be part of the entity systems 120. In other embodiments, the entity systems 120 are distinct from the authentication chain system 130. The authentication chain system 130 may communicate with the entity systems 120 via a secure connection generated for secure encrypted communications between the two systems either over the network 101 or alternative to the network 101.

As illustrated in detail in FIG. 4, the environment 100 further includes one or more entity systems 120 which are connected to the user device 110 and the authentication chain system 130. The entity systems 120 may be associated with one or more entities, institutions or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110 and the authentication chain system 130 to provide access to accounts and resources stored and maintained on the entity systems 120. In some embodiments, the entity system 120 may communicate with the authentication chain system 130 during an interaction or authentication session with a user 102 in real-time, wherein user interactions or authentication sessions may be monitored and processed by the authentication chain system 130. In some embodiments, data storage 408 comprises user information database 416 and/or interaction database 420 to either supplement or replace similar data storages or databases on the authentication chain system 130 as previously discussed.

The systems of the environment 100 may be used to identify and/or prevent attempted unauthorized access by providing a reliable and secure authentication method. As previously discussed, the system of the present invention is configured to generate a chain-like sequence of previous authentication sessions with which to validate or authorize a subsequent authentication session associated with a requested interaction. The system links the authentication sessions together by generating unique authentication tokens required for subsequent authentications to create a record of authentications that is difficult for unauthorized users to break or successfully insert themselves into.

FIG. 5 provides an illustration of an authentication session chain, in accordance with one embodiment of the invention. As illustrated in the figure, the authentication session chain comprises one or more successive authentication sessions (e.g., session N−3 to session N). The plurality of successive authentications sessions is linked together by authentication tokens generated by the system, wherein a new or subsequent authentication session may not be validated, authorized, and/or added to the chain without a token associated with the previous authentication session being provided back by a requesting user and/or user device (e.g., back to the authentication chain system 130).

As used herein, an "authentication session" or an "authentication" may refer to any process for validating an identity or authentication information provided by a user and/or user device requesting access to a secure resource (e.g., an account, data, etc.) or requesting an interaction with a secure system. In some embodiments, an authorization session may comprise a process for authorizing or rejecting a requested interaction from a user and/or user device.

As used herein, a "token" may refer to any form of non-sensitive (i.e., no intrinsic meaning or value) data element used in substitution for, as a representation of, or as a reference to a sensitive data element. In some embodiments, a token may include one or more passwords, one-time passwords, PIN numbers, biometric information (e.g., fingerprints, retinal scans, voice recognition, facial recognition), signatures, images, security keys, or the like. In some embodiments, a token may include randomized and/or cryptographically encrypted data. In one embodiment, a token may include one or more hash values, codes, checksums, or the like. In some embodiments, a token may be used with a look-up table, hash table, or the like for rapid look-up of mapped or associated information. In some embodiments, a token may be hardware-based, wherein the token comprises device identification information associated with a particular user device (e.g., a mobile device or computer). In some embodiment, a token may refer to a physical security token device (e.g., a keycard, USB drive, or similar device) that can be used to gain access to a secure electronic resource (e.g., data).

In some embodiments described herein, a token may include one or more token components or portions used to generate the token, wherein the one or more token components may be received from different sources or communication channels. In some embodiments, such as the illustrated embodiment in FIG. 6, the token may comprise individual components such as a device token component 602, a user token component 604, and/or an authentication record token component 606. These components may be used as identifier information used in an authentication process for generating a complex, hybrid authentication token having several layers of data complexity (i.e., the combined token components).

As illustrated in block 602 of FIG. 6, the authentication token may comprise a device token component 602. In some embodiments, the device token component 602 may comprise device identification information associated with a particular user device (e.g., user device 110) and/or device application (e.g., user application 238). In a specific example, a user device may include a user mobile device. In another specific example, a device application may include a dedicated authentication application configured to generate authentication information (e.g., one-time passwords, temporary codes, QR codes, or the like). In one example, a device token component 602 may include an international mobile subscriber identity (IMSI) and/or a related key associated with a subscriber identity module (SIM) card associated with a particular user device. Other non-limiting examples of device token components 602 may include one or more serial numbers, model numbers digital signatures, security tokens, GPS-derived location information, network location information (e.g., an IP address, a connected Wi-Fi network location) or the like associated a particular user device. In some embodiments, the device token component 602 may be tied to a particular or one specific user device or application, wherein the same user device or application must be used to successfully validate a subsequent authentication session. In some embodiments, the system may leverage a preexisting or preinstalled component or application of the user device that is configured or has been configured or modified by the system as a device token component 602. For example, the system may extract a portion of a value or number generated by the processing device of the user device (e.g., a stream of bits) while executing another task (i.e., extract a random numeral from a stream of generated values).

As illustrated in block 604, the authentication token may comprise a user token component 604, wherein the user token component comprises user-specified or user-set or user-provided information and/or data. Non-limiting examples of a user token component 604 may include a password, PIN, user biometric information (e.g., fingerprints, retinal scans, voice recognition, facial recognition), captured images, and the like. In a specific embodiment, wherein the user token component 604 comprises a captured image, the system may be configured to control a user device to access an image capturing device or camera associated with the user device (e.g., camera 216 of user device 110), wherein the camera is configured to capture an image which may be directly used or modified to be indirectly used by the system (e.g., the authentication chain system 130) as a component of a generated authentication token. In some embodiments, the user token component 604 may further comprise interaction information associated with the user such as one or more previously executed and/or scheduled interactions associated with the user (e.g., a scheduled monthly resource transfer).

As illustrated in block 606, the authentication token may comprise an authentication record or authentication trail component 606. In some embodiments, the authentication record component 606 may comprise information and/or data associated with one or more previous authentication sessions and/or associated interactions (i.e., an interaction following an authentication session). Non-limiting examples of an authentication trail component 606 may include a time of an authentication, a location (e.g., physical location and/or network location) of an authentication, an associated confidence score of an authentication, a number of failed login attempts associated with one or more authentications, behavior patterns derived from one or more previous authentication sessions and/or associated interactions (e.g., via machine learning analysis), and the like.

As illustrated in block 608, individual token components or portions of the authentication token are received by a transformation function 608 of the system. The transformation function 608 may be configured for receiving an input of the token components (e.g., device component 602, user component 604, and authentication record component 606) and generating the unique token based on the components. As previously discussed, the transformation function 608 may be configured to transform the input token components in order to generate a complex, hybrid authentication token having several layers of data complexity (i.e., the combined token components). In one particular embodiment, the transformation function 608 comprises a hash function configured to transform the components of a first data size into a hash value having a fixed, second data size, wherein the second data size is smaller than the original, first data size.

As illustrated in block 610, the system generates a new token for a subsequent authentication session using the transformation function. By requiring the authentication record component 606 during generation of the authentication token, the system links or ties previous authentication sessions together creating a blockchain-like record of the authentication sessions. Furthermore, by requiring the newly generated token for a next or subsequent authentication session, the system makes it more difficult for unauthorized users to break or successfully insert themselves into the established authentication chain thereby increasing data security and the reliability of the data associated with the secured record of authentication sessions (i.e., the authentication chain).

As illustrated in block 612, the system is configured to store the generated token for a subsequent authentication session. In some embodiments, the system is configured to store the token or a portion of the token (i.e., part of a key pair) on particular user device and/or application (e.g., user device 110 and/or user application 238). In some embodiments, the token, a corresponding portion of the token (e.g., a portion of a key pair), or a copy of the token may be stored on another system and/or device (e.g., authentication chain system 130 or entity system 120) to confirm validity of a provided token provided to the system from a user device and/or user during a subsequent authentication session or interaction.

FIG. 7 provides a high level process flow for an authenticating a requested interaction based on a provided authentication token, in accordance with one embodiment of the invention. As illustrated in block 710 of FIG. 7, the process is initiated when the system determines that a new authentication session has been initiated by a user and/or user device. In some embodiments, the system is configured to determine a new authentication session based on a user and/or user device requesting a new authentication session over a communication channel (e.g., an application). In another embodiment, the system may be configured to automatically initiate a new authentication session with a user and/or user devices in response to identifying a requested interaction associated with the user and/or user device that requires authentication. For example, a user may request a resource transfer (e.g., data, funds, etc.) between resource storage locations (i.e., accounts) which may require user authentication.

As illustrated in block 720, the system receives an authentication request associated with a requested user interaction. In some embodiments, an authentication or interaction request may include a user logging-in or otherwise attempting to authenticate the user's identity to access an account of the user (e.g., an account) on a user device. In another embodiment an interaction request may include a request to exchange or transmit resources (e.g., data or funds). In response to receive the request, as illustrated in block 730, the system requests an authentication token from the requesting user and/or user device. In a preferred embodiment, the system requests an authentication token associated with one or more previous authentication sessions (i.e., based on the established authentication chain) as previously discussed herein.

As illustrated in block 740, the system receives an authentication token transmitted from the user and/or user device. In one embodiment, a user and/or user device may transmit an authentication token stored on the user device and/or in an application stored on the user device. In some embodiments, the system may be configured to automatically extract an authentication token from a user device in response to a requested authentication sessions and/or interaction associated with the user device.

As illustrated in block 750, the system may be configured to analyze the received token for validation of the authentication request and the identity of the user and/or user device. In some embodiments, analyzing the authentication token may comprise matching the token to a valid copy of the token. In another embodiment, analyzing the authentication token may comprise using one or more lookup tables or the like to validate the provided token. In yet another embodiment, analyzing the token may comprise matching the token or a portion of the token provided by the user device with a corresponding portion stored by the system (i.e., a key pair).

If the token is validated by the system, the process may continue to block 770, wherein the system is configured to accept the provided authentication token and authenticate a requested user interaction. If the token is not validated by the system (i.e., rejected), the process may continue to block 780, wherein the system denies a requested user interaction. In some embodiments, an unsuccessful match may indicate attempted unauthorized access or misappropriation. In some embodiments, in response to not validating a token and/or request, the system may be configured to flag the rejected device and/or user as attempted unauthorized access for future requested interactions.

FIG. 8 provides a high level process flow for authentication chain analysis, scoring, and reconfiguration, in accordance with embodiments of the invention. As illustrated in block 810, the system may be configured to analyze an authentication chain. One or more of the previous successive authentication sessions on the authentication chain may be analyzed to determine patterns or behaviors from the previous sessions. Non-limiting examples of analyzed data associated with previous authentication sessions may include previous log-ins, failed log-ins, log-in velocity, authentication anomalies, devices and device information associated with authentications, location history (i.e., physical and network locations), IP address history, password changes, interactive voice response (IVR) interactions, interaction activity and history, and the like.

In some embodiments, the system leverages machine learning models (e.g., machine learning models 328) while analyzing the authentication chain. In some embodiments, the system is configured to train one or more machine learning models using monitored authentication and/or interaction data associated with an analyzed authentication chain to identify one or more patterns. In this way, the machine learning models may be trained and configured to accurately identify and authenticate the user device and/or associated user during subsequent interactions involving said user device and/or associated user. In some embodiments, the trained machine learning models may comprise at least one of a supervised learning component (i.e., leveraging established training data), an unsupervised learning component (i.e., patterning from a data stream in real-time), and/or a semi-supervised learning component.

In some embodiments, the system may further leverage artificial intelligence and/or deep learning neural networks for analyzing the authentication chain and the authentication sessions stored thereon, wherein the deep neural network comprises multiple layers between input and output layers for modeling complex data and patterns. In other embodiments, the system may leverage decision tree learning for decisioning purposes and predictive modeling.

As illustrated in block 820, the system is configured to calculate scoring associated with blocks (i.e., previous authentication sessions) on the authentication chains based on the identified patterns of the machine learning analysis. As shown in additional detail in FIG. 9, the system may calculate confidence scoring (e.g., $R_{(N-3)}$, $R_{(N-2)}$, $R_{(N)}$, etc.) for individual authentication sessions on the authentication chain to identify any previous authentication sessions that contain anomalies. Scores may be calculated and assigned to individual authentications based on the systems confidence in an individual authentication being associated with authorized access. For example, multiple failed log-in attempts may lower a confidence score for a particular authentication. In another example, a log-in from a location or device not associated with an authorized user may also lower a confidence score for an authentication. Confidence scores may be compared to predetermined thresholds to determine additional actions by the system (e.g., enhanced authentication security, rejection of a requested authentication and/or interaction, etc.). In some embodiments, authentication anomalies may be indicative of attempted unauthorized access. The system is configured to identify and rectify suspicious authentications potentially associated with unauthorized access in order to maintain data reliability and accuracy in the authentication chain.

Referring now back to FIG. 8, as illustrated in block 830, the system may determine required authentication enhancement in order to secure subsequent authentication sessions and associated interactions. In some embodiments, authentication enhancement may comprise adding additional authentication mechanisms to an authentication session procedure. Non-limiting examples of authentication enhancements to subsequent authentication sessions may include additional log-in challenges, one-time passwords, biometric user identification, and/or any additional authentication step required for validating an identity of a user and/or a user device. In some embodiments, the additional authentication mechanisms may comprise adding or otherwise modifying the token components (i.e., device token component 602, user token component 604, and/or authentication record token component 606) input to the transformation function for generating a token for a subsequent authentication.

As illustrated in block 840, the system may calculate weightings associated with one or more components input into the transformation function used to generate a hybrid authentication token. As previously discussed, in a preferred embodiment of the invention, a hybrid authentication component may comprise a device token component 602, a user token component 604, and/or an authentication record token component 606. The system may be configured to calculate confidence scoring for the components of the authentication components as well as the individual authentication sessions as previously discussed based on the patterns and behaviors identified by the analysis of the authentication chain.

As illustrated in block 850, the system is configured to modify or adjust the weights of the components input to the transformation function in response to analysis of the authentication chain. The system may recalculate weightings of the components to the transformation function to give more or less weight or significance to one or more of the token components for subsequent authentication sessions. In this way, the authentication token is a dynamic authentication token that may be configured by the system for a next authentication session and adapt to anomalies such as potential unauthorized access attempts. In a particular embodiment, wherein the system identifies suspected or attempted unauthorized access based on identification of one or more authentication anomalies, the system may be configured to recalculate one or more weightings of the token components based on the particular anomalies. For example, in response to an authentication request from a new or unknown device, the system may be configured to reduce the weighting or significance of the device token component when generating a new token for a subsequent authentication sessions. In another example, the system may weight the authentication record token component higher than the user token component or the device token component in order to combat unauthorized access techniques such as SIM hijacking or unauthorized one-time password use. In a specific embodiment, the system may be configured to recalculate all tokens or hashed values in an authentication chain based on determining an unauthorized access attempt.

As illustrated in block 860, the system is configured to remove entries from the authentication chain associated with suspected unauthorized access. In some embodiments, the system may be configured to modify or adjust a configuration of the authentication chain based on the analysis (e.g., machine learning analysis), wherein the system may modify one or more authentication sessions positioned on the authentication chain. In some embodiments, the system may be configured to modify one or more entries on the authentication chain based on calculated confidence scores being below a predetermined threshold value which may indicate potential unauthorized access. In one embodiment, modifying the authentication chain may comprise removing one or more entries on the authentication chain based on the calculated confidence scores. For example, the system may remove one or more previous authentication sessions (i.e., entries or blocks) on the authentication chain that may be associated with unauthorized access. In this way, unauthorized sessions may be removed from the authentication chain to preserve data reliability and patterns of authorized access. In another embodiment, modifying the authentication chain may comprise generating a new authentication chain, wherein the new authentication chain comprises a portion of the previous authentication chain determined to be not associated with unauthorized access. For example, the system may determine a portion of the authentication chain associated with potential unauthorized access and a portion associated with authorized access, wherein the system removes the portion associated with authorized access to start a new authentication chain using the removed portion. In this way, the system may be confident in the reliability of the data on the new authentication chain based on the authorized portion. The new chain may have subsequent authentication sessions added to continue the chain.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with authentication and also preventing unauthorized access.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for device authentication, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamically reconfiguring a chain of successive authentication sessions, the system comprising:
    a memory device with computer-readable program code stored thereon;
    a communication device connected to a network; and
    a processing device, wherein the processing device is configured to execute the computer-readable program code to:
        analyze, via a machine learning model, one or more entries on an authentication chain, the authentication chain comprising a plurality of successive authentication sessions linked by a plurality of corresponding tokens;
        calculate confidence scores associated with each of the one or more entries based on an output of the machine learning model;
        determine unauthorized access associated with an entry of the one or more entries based on a corresponding confidence score being below a predetermined threshold; and
        in response to determining the unauthorized access, reconfigure the authentication chain, wherein reconfiguring the authentication chain comprises modifying at least one of the plurality of successive authentication sessions and the corresponding tokens.

2. The system of claim 1, wherein reconfiguring the authentication chain further comprises removing at least some of the one or more entries on the authentication chain based on the confidence scores.

3. The system of claim 1, wherein reconfiguring the authentication chain comprises generating a new authentication chain, wherein the new authentication chain comprises a portion of the authentication chain determined to be not associated with unauthorized access.

4. The system of claim 1, wherein the corresponding tokens comprise hashed values, and wherein reconfiguring the authentication chain comprises recalculating all of the hashed values based on determining the unauthorized access.

5. The system of claim 1, wherein each of the plurality of corresponding tokens comprises a device token component, a user token component, and an authentication record token component, and wherein the processing device is further configured to execute the computer-readable program code to calculate and apply a weighting for each of the device token component, the user token component, and the authentication record token component based on the confidence scores.

6. The system of claim 5, wherein the processing device is further configured to execute the computer-readable program code to modify required authentication mechanisms associated with subsequent authentication sessions based on determining the unauthorized access, wherein modifying the required authentication mechanisms comprises adding or removing one or more authentication mechanisms required by the subsequent authentication sessions.

7. The system of claim 6, wherein the one or more authentication mechanisms comprise the device token component, the user token component, and the authentication record token component.

8. The system of claim 1, wherein the machine learning model comprises at least one of a deep learning neural network and a decision tree learning model.

9. The system of claim 8, wherein the machine learning model comprises at least one of a supervised learning component, an unsupervised learning component, and a semi-supervised learning component.

10. A computer program product for dynamically reconfiguring a chain of successive authentication sessions, wherein the computer program product comprises a non-transitory computer-readable medium comprising computer-readable instructions, the computer-readable instructions, when executed by a processing device, cause the processing device to:
 analyze, via a machine learning model, one or more entries on an authentication chain, the authentication chain comprising a plurality of successive authentication sessions linked by a plurality of corresponding tokens;
 calculate confidence scores associated with each of the one or more entries based on an output of the machine learning model;
 determine unauthorized access associated with an entry of the one or more entries based on a corresponding confidence score being below a predetermined threshold; and
 in response to determining the unauthorized access, reconfigure the authentication chain, wherein reconfiguring the authentication chain comprises modifying at least one of the plurality of successive authentication sessions and the corresponding tokens.

11. The computer program product of claim 10, wherein reconfiguring the authentication chain further comprises removing at least some of the one or more entries on the authentication chain based on the confidence scores.

12. The computer program product of claim 10, wherein reconfiguring the authentication chain comprises generating a new authentication chain, wherein the new authentication chain comprises a portion of the authentication chain determined to be not associated with unauthorized access.

13. The computer program product of claim 10, wherein the corresponding tokens comprise hashed values, and wherein reconfiguring the authentication chain comprises recalculating all of the hashed values based on determining the unauthorized access.

14. The computer program product of claim 10, wherein each of the plurality of corresponding tokens comprises a device token component, a user token component, and an authentication record token component, and wherein the computer-readable instructions, when executed by the processing device, further cause the processing device to calculate and apply a weighting for each of the device token component, the user token component, and the authentication record token component based on the confidence scores.

15. The computer program product of claim 14, wherein the computer-readable instructions, when executed by the processing device, further cause the processing device to modify required authentication mechanisms associated with subsequent authentication sessions based on determining the unauthorized access, wherein modifying the required authentication mechanisms comprises adding or removing one or more authentication mechanisms required by the subsequent authentication sessions.

16. The computer program product of claim 15, wherein the one or more authentication mechanisms comprise the device token component, the user token component, and the authentication record token component.

17. The computer program product of claim 10, wherein the machine learning model comprises at least one of a deep learning neural network and a decision tree learning model.

18. The computer program product of claim 17, wherein the machine learning model comprises at least one of a supervised learning component, an unsupervised learning component and a semi-supervised learning component.

19. A computer-implemented method for dynamically reconfiguring a chain of successive authentication sessions, the computer-implemented method comprising:
 analyzing, via a machine learning model, one or more entries on an authentication chain, the authentication chain comprising a plurality of successive authentication sessions linked by a plurality of corresponding tokens;
 calculating confidence scores associated with each of the one or more entries based on an output of the machine learning model;
 determining unauthorized access associated with an entry of the one or more entries based on a corresponding confidence score being below a predetermined threshold; and
 in response to determining the unauthorized access, reconfiguring the authentication chain, wherein reconfiguring the authentication chain comprises modifying at least one of the plurality of successive authentication sessions and the corresponding tokens.

20. The computer-implemented method of claim 19, wherein reconfiguring the authentication chain further comprises removing at least some of the one or more entries on the authentication chain based on the confidence scores.

* * * * *